United States Patent [19]

Shore et al.

[11] Patent Number: 5,526,726

[45] Date of Patent: Jun. 18, 1996

[54] HIGH SPEED SHEAR FOR END TRIMMING RODS AND THE LIKE

[75] Inventors: Terence M. Shore, Princeton; Melicher Puchovsky, Dudley; Harold E. Woodrow, Northboro, all of Mass.

[73] Assignee: Morgan Construction Company, Worcester, Mass.

[21] Appl. No.: 173,207

[22] Filed: Dec. 23, 1993

[51] Int. Cl.⁶ .................................................. B23D 25/12
[52] U.S. Cl. ............................ 83/105; 83/342; 83/306; 83/444; 83/672
[58] Field of Search ........................... 83/672, 303, 306, 83/340, 342, 343, 105, 106, 107, 439, 440, 444, 162, 164, 165

[56] References Cited

U.S. PATENT DOCUMENTS

| 801,267 | 10/1905 | Reid | 83/343 |
|---|---|---|---|
| 3,172,320 | 3/1965 | Talbot | 83/672 |
| 3,504,718 | 4/1970 | Pittman et al. | 83/340 |
| 3,630,126 | 12/1971 | Ronai | 83/672 |
| 3,760,670 | 9/1973 | Poran | 83/306 |
| 3,901,114 | 8/1975 | Cage | 83/340 |

FOREIGN PATENT DOCUMENTS

| 7012259 | 7/1970 | Germany . | |
| 2435486 | 2/1976 | Germany | 83/306 |
| 3042171 | 6/1982 | Germany . | |
| 2185433 | 7/1987 | United Kingdom . | |

Primary Examiner—Rinaldi I. Rada
Assistant Examiner—Charles Goodman
Attorney, Agent, or Firm—Samuels, Gauthier, Stevens & Reppert

[57] ABSTRACT

Apparatus for shearing elongated products such as rods, bars and the like moving longitudinally along a path of travel. The apparatus includes a pair of constant diameter helical blades mounted for rotation about axes parallel to the path of travel. The rotational orientation of the blades and the spacing between their respective axes is such that segments of the blades coact along a cutting path parallel to the path of travel. The blades are rotated in opposite directions to thereby cause coacting segments thereof to move repetitively along the cutting path in the direction of product movement. A switch diverts the products from the path of travel across the cutting path for shearing by the coacting segments of the cutting blades.

12 Claims, 6 Drawing Sheets

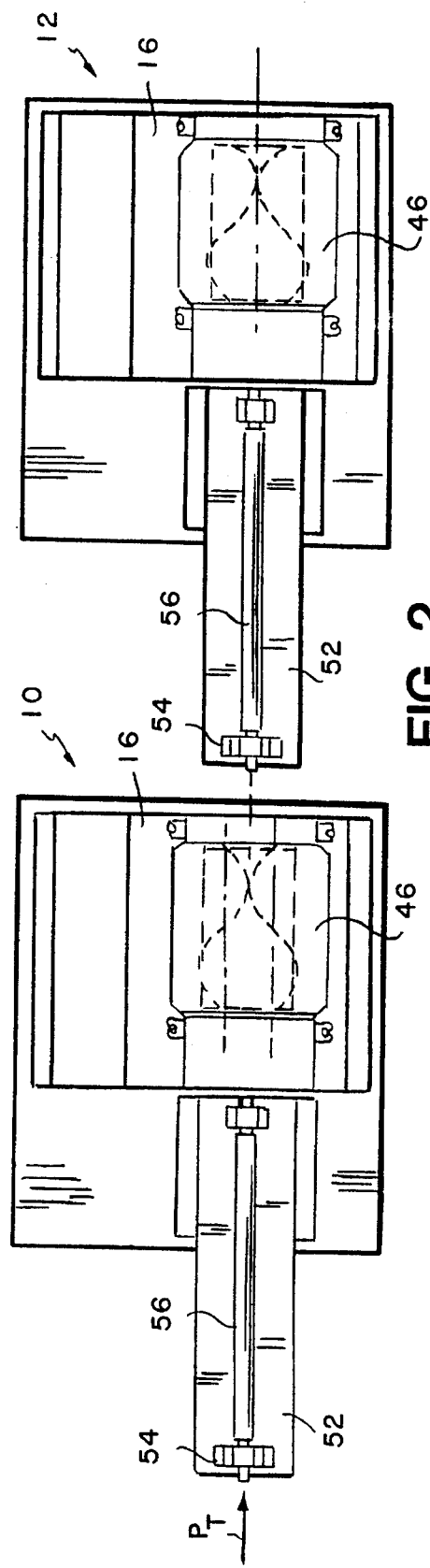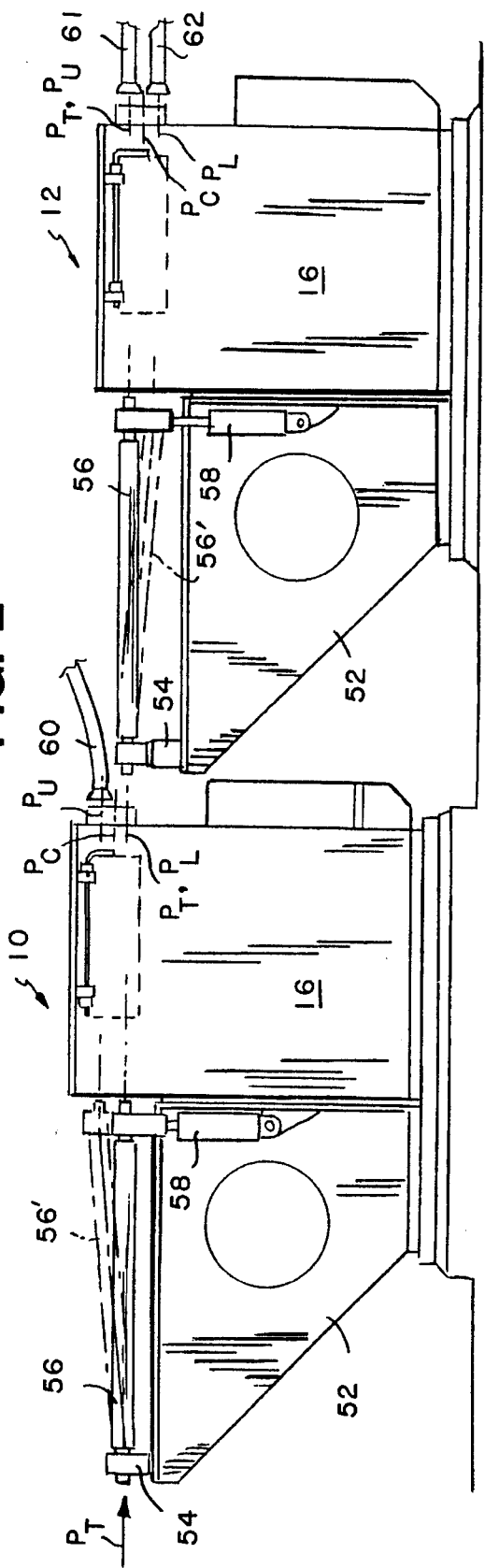
FIG. 2
FIG. 1

HIGH SPEED SHEAR FOR END TRIMMING RODS AND THE LIKE

BACKGROUND OF THE INVENTION

1. Field of the Invention

This invention relates in general to continuous hot rolling mills of the type producing rods, bars and the like, and is concerned in particular with an improved shear for trimming the front and back ends from hot rolled rods being delivered from the finishing stands of high speed rod mills.

2. Description of the Prior Art

Conventionally, the front and back ends of hot rolled rods are trimmed by shears located along the rolling line in advance of the finishing stands, where the product is moving at slower speeds. Some trimming shears operate intermittently, whereas others operate continuously. Intermittently operable shears necessarily require complex control systems which precisely position the shear blades during each cut in response to rod end position signals generated by sensors located along the rolling line. From the standpoint of control complexity, continuously operating shears such as disc shears are far less demanding, but they commonly produce sharply oblique cuts with undesirable jagged ends.

In any event, none of the conventional disc shears has been deemed capable of operating safely and reliably at delivery speeds on the order of 90 m/sec. and higher. Thus, the front and back ends of finish rolled rods must be trimmed manually after the laying head, either while the product is being conveyed in overlapping ring form on the cooling conveyor, or after the cooled rings have been gathered into a coil at the reforming station. Manual trimming is labor intensive, often inconvenient, and potentially hazardous to operating personnel.

SUMMARY OF THE INVENTION

An objective of the present invention is the provision of an improved shear for trimming the front and back ends from rods emanating at high speed from the finishing stands of rod mills.

A related objective of the present invention is the provision of a continually operating shear which inherently makes a single cut in response to diversion of the product from its normal path of travel, and which does not require a rod end position signal to coordinate actuation of tile shear blades.

Still another objective of tile present invention is the provision of a continually operating shear which severs the product cleanly and at an angle which avoids undesirable sharp or jagged ends.

In a preferred embodiment of the invention to be described hereinafter in greater detail, these and other objects and advantages are achieved by the provision of a shear having a pair of constant diameter helical blades mounted for contra-rotation about axes parallel to the path of product travel. The rotational orientation of the shear blades and the spacing between their rotational axes is such that segments of the blades coact along a cutting path parallel to the path of product travel. The shear blades are contra-rotated continually, thereby causing their coacting segments to move repetitively along tile cutting path in tile direction of and at a speed at least equal to that of products moving along the path of product travel. An upstream switch pipe is operable to divert products from their normal path of travel across the cutting path for shearing by the coacting segments of the cutting blades.

BRIEF DESCRIPTION OF THE DRAWINGS

FIG. 1 is a view in side elevation of a pair of shears in accordance with the present invention positioned sequentially along the path of product travel;

FIG. 2 is a plan view of the shears shown in FIG. 1;

DETAILED DESCRIPTION OF PREFERRED EMBODIMENT

Figure 4:
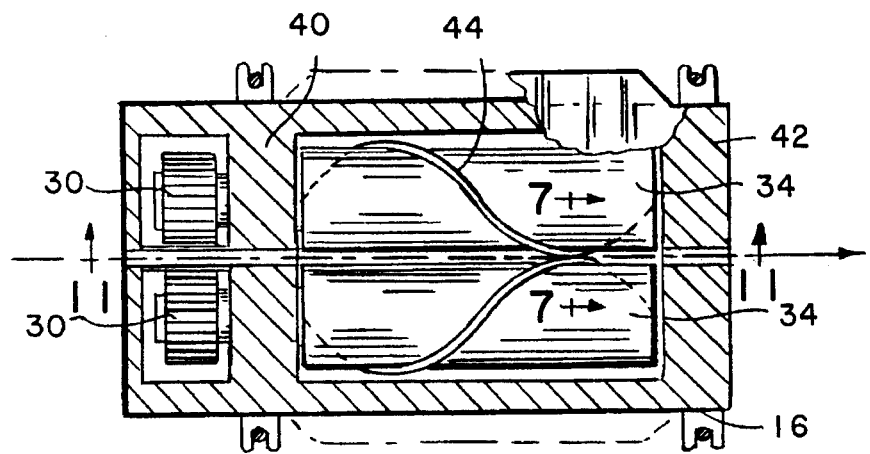
FIG. 4 is a plan view of the shear shown in FIG. 3 with portions of the housing and inspection lid broken away.
Figure 3:
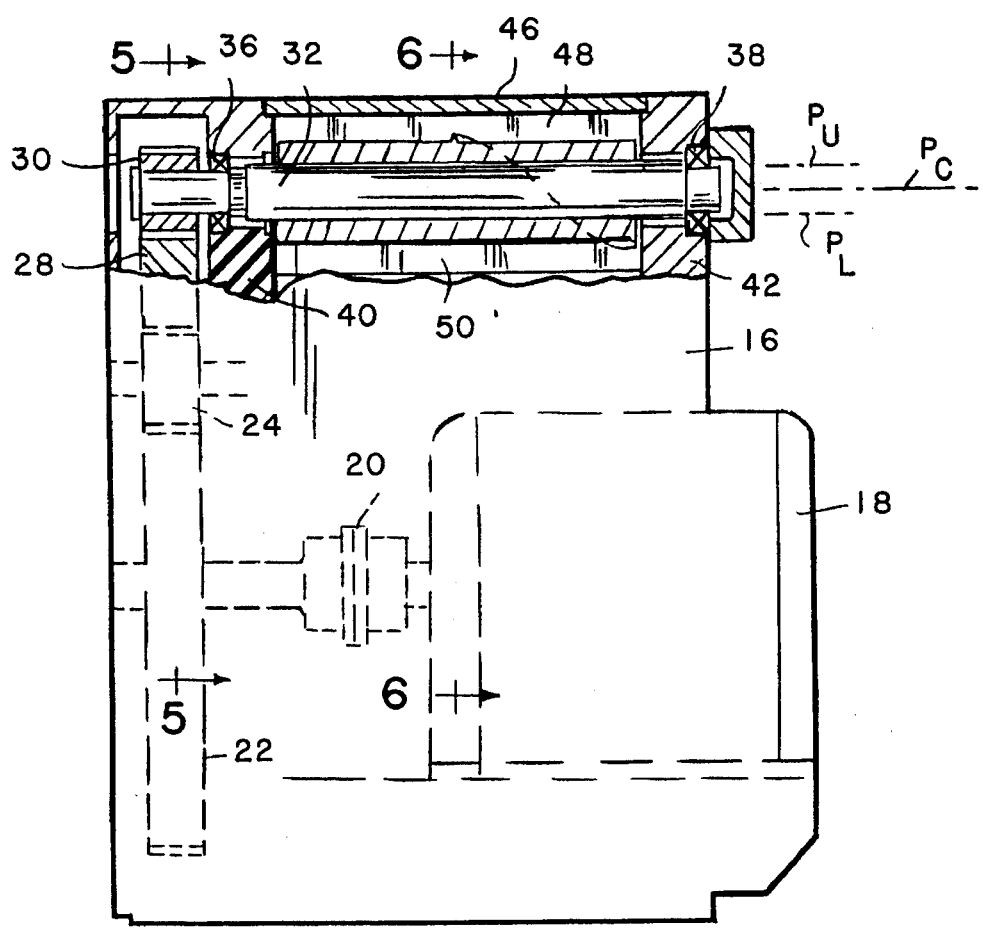
FIG. 3 is an enlarged side view of one of the shears shown in FIG. 1, with a portion of the outer housing broken away.
Figure 6:
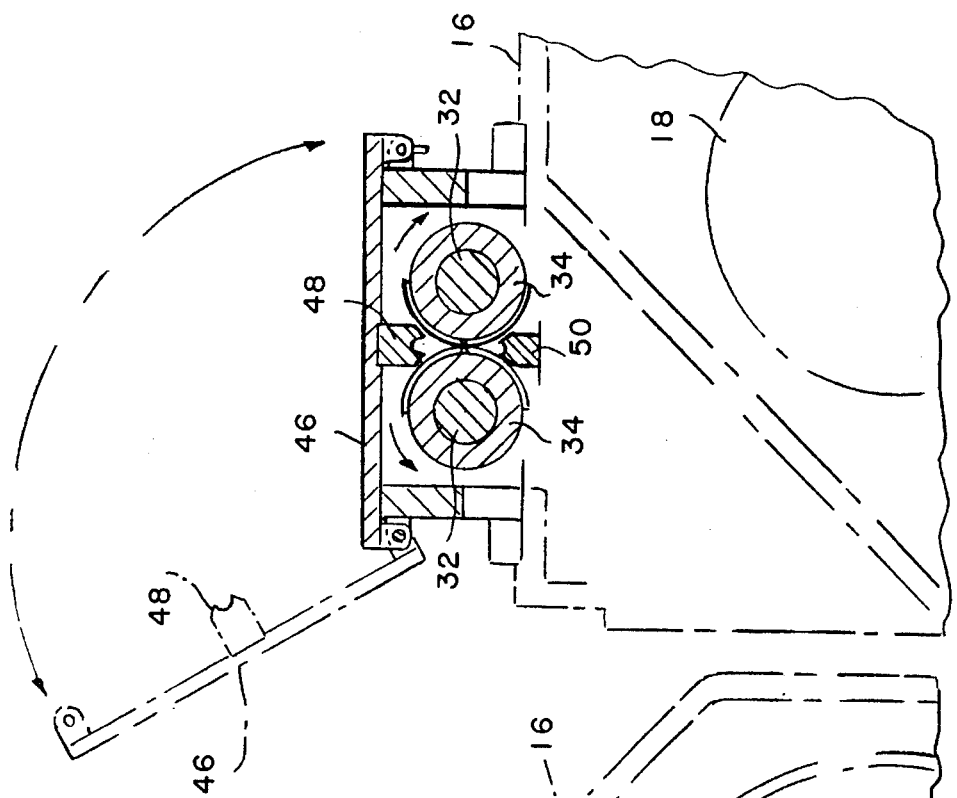
FIGS. 5 and 6 are partial sectional views taken along lines 5—5 and 6—6 of FIG. 3.
Figure 5:
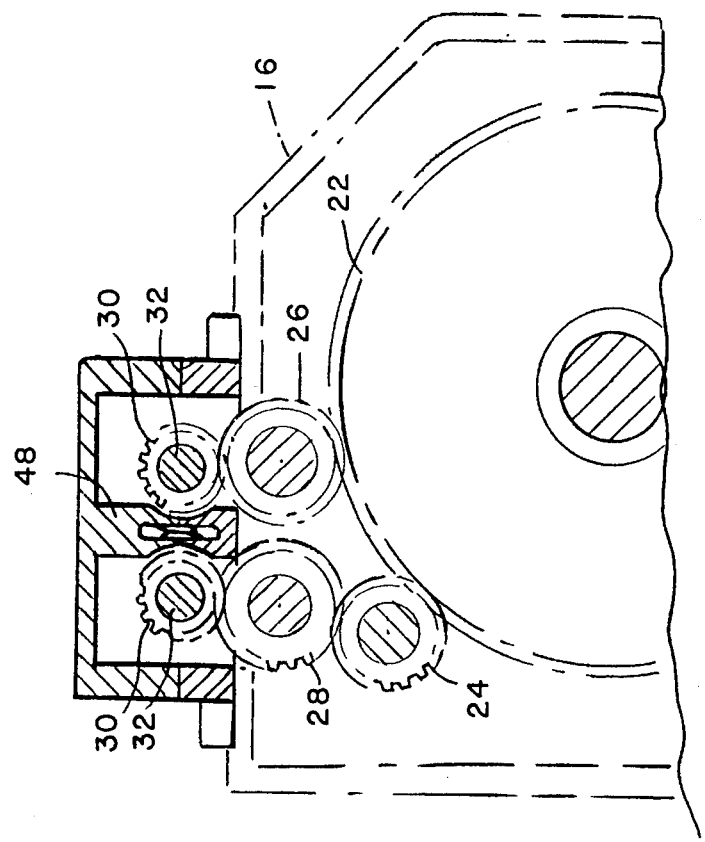
Figure 7:
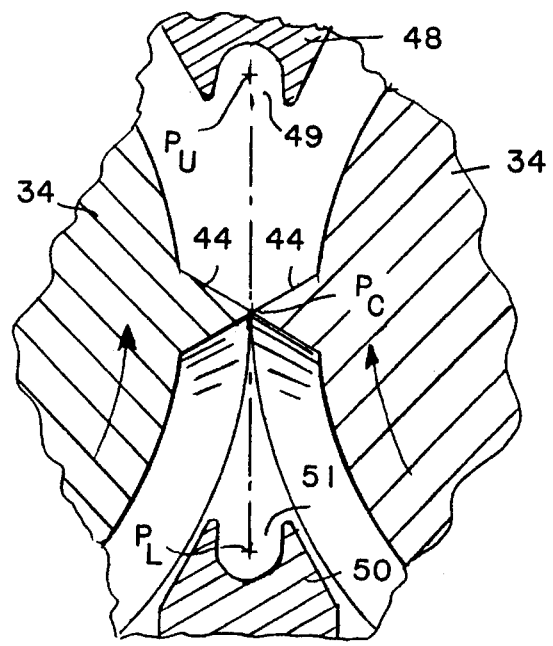
FIG. 7 is a sectional view on a greatly enlarged scale taken along line 7—7 of FIG. 4.

Referring initially to FIGS. 1 and 2, shears 10, 12 embodying the concepts of the present invention are shown positioned sequentially along a path of product travel $P_2$. Shear 12 operates to trim the front end of a product, and shear 10 operates in a similar manner to trim the back end of the product. Both shears are essentially identical in design and construction, with shear 12 being mounted at a level slightly beneath that of shear 10.

As best can be seen by further reference to FIGS. 3 to 7, each shear includes a housing structure 16 containing a drive motor 18 with its output shaft coupled as at 20 to a large diameter drive gear 22. Gear 22 meshes with a pair of idler gears 24, 26, and idler gear 24 meshes with a third idler gear 28. Idler gears 26, 28 mesh with pinions 30 on shafts 32 carrying cylindrical drums 34. The shafts 32 are rotatably journalled between bearings 36, 38 carried on robust parallel walls 40, 42 forming part of the housing structure 16. The interposition of idler gear 28 between idler gear 24 and the pinion 30 of one of the shafts 32 insures that the shafts are contra-rotated in response to rotation of drive gear 22.

Each drum 34 is provided on its exterior with a constant diameter helical blade 44. Each blade 44 extends from end to end along and circumscribes a single turn around its respective drum 34. Preferably, the axial length of the helix is not greater than the circumference of the circular path circumscribed by blade rotation. The rotational axes of the cylindrical drums 34 and their respective helical blades 44 are parallel to the path of product travel $P_T$. The rotational orientation of the blades 44 and the spacing between their respective rotational axes is such that, as can best be seen in FIG. 7, segments of the blades coact along a cutting path $P_c$ parallel to path $P_T$.

The cylindrical drums 34 underlie an access lid 46 which closes off the top of the housing 16 and which may be opened for inspection of the blades 44. Lid 46 carries a depending guide 48 having a downwardly facing groove 49 defining an upper guide path $P_u$ overlying the cutting path $P_c$. The housing walls 40, 42 carry a similarly configured but oppositely disposed guide 50 having an upwardly facing groove 51 defining a lower guide path $P_L$ underlying the cutting path $P_c$.

Each shear housing 16 is preceded by a pedestal 52 carrying a bracket 54. The brackets 54 pivotally support the upstream ends of switch pipes 56, the downstream ends of which are adjustable vertically by pneumatic cylinders 58 supported on the housings 16. The cylinders 58 operate to adjust the downstream ends of their respective switch pipes 56 between free running positions aligned with the path $P_T$ of product travel as indicated by the full lines in FIG. 1, and angularly disposed positions 56' depicted by the broken lines.

As can best be seen in FIG. 1, the difference in elevation of shears 10, 12 with respect to the path of product travel $P_T$ results in the following relationships: shear 10 has its lower guide path $P_L$ aligned with the path of product travel $P_T$, with its cutting path $P_c$ and upper guide path $P_u$ located respectively thereabove, and with the upper guide path $P_u$ leading to an exit pipe 60 for sheared back ends. In contrast, shear 12 has its upper guide path $P_u$ aligned with the path of product travel $P_T$ and leading to a downstream guide pipe 61, and has its cutting path $P_c$ and lower guide path $P_L$ arranged therebeneath, the latter leading to an exit pipe 62 for sheared front ends.

Figure 8A:
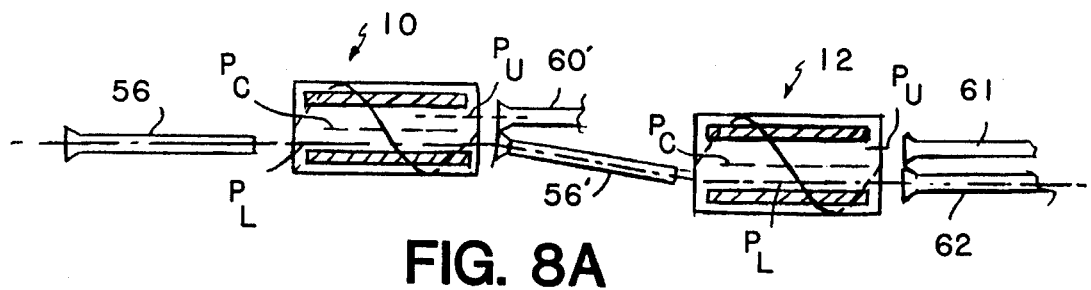
FIGS. 8A—8C are schematic illustrations depicting various stages in a front and back end trimming operation.

A front and back end shearing operation will now be described with reference to FIGS. 8A–8C. As shown in FIG. 8A, the front end of a product has passed through shear 10 along its lower guide path $P_L$ and has been deflected by the angularly disposed switch pipe 56' of shear 12 along its lower guide path $P_L$, into the front end exit pipe 62.

Figure 8B:
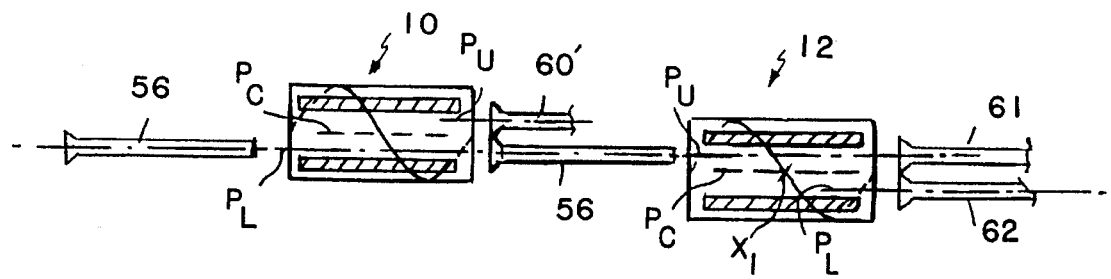

At the appropriate time, and as illustrated in FIG. 8B, the switch pipe of shear 12 is shifted vertically into alignment with its upper guide path $P_u$, thus effecting a single cut $X_1$ as the product is directed across the cutting path $P_c$. The severed front end exits through pipe 62, and the remainder of the product continues on through pipe 61.

Figure 8C:
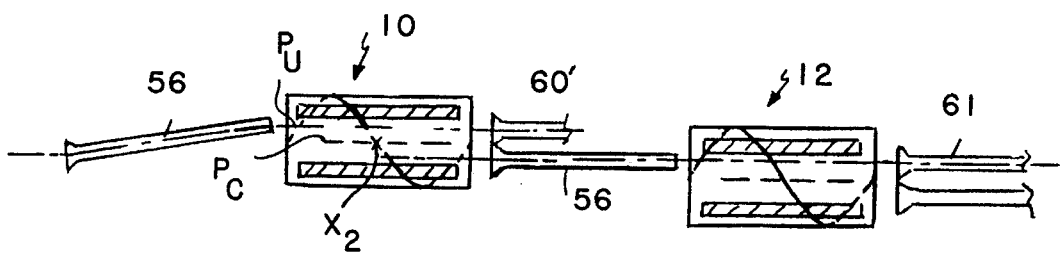

As shown in FIG. 8C, as the back end of the product approaches shear 10, its switch pipe is adjusted to position 56', thereby deflecting the product across its cutting path $P_C$ to effect a single cut $X_2$. The product continues along the lower guide path $P_L$, while the severed back end is directed along upper guide path $P_u$ into exit pipe 60.

Figure 9:
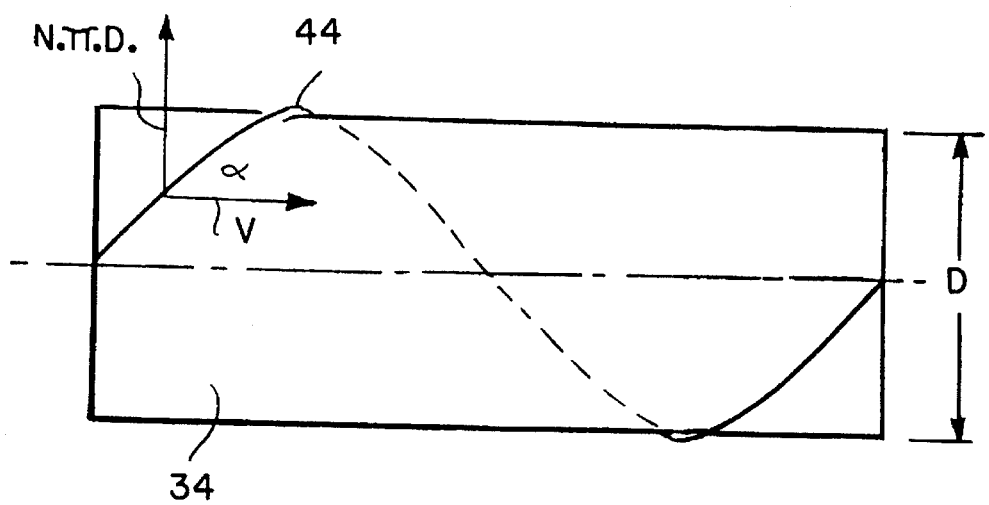
FIG. 9 is a diagrammatic illustration of a helical shear blade.

With reference to FIG. 9, it will be understood that the velocity V at which the coacting cutting segments of the helical blades 44 traverse the cutting path $P_C$ must at least equal the speed of the product moving along the path of product travel $P_T$. The velocity V is a function of several variables, including the diameter D of the blade helix, the helix angle $\propto$, and the rotational speed N of the drums 34.

Figure 10:
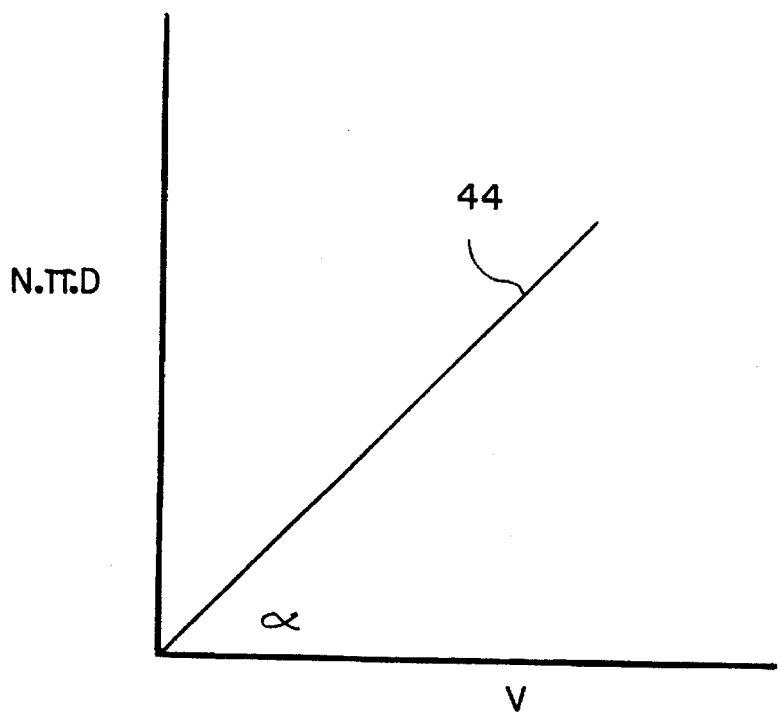
FIG. 10 is a graph illustrating the interrelationship of the helix angle with product speed and the rotational speed of the helical blades.

FIG. 10 graphically depicts a shear blade unrolled about its axis.

$$\text{Thus, Tan} \propto = \frac{N\pi D}{V}$$

$$N = \frac{V(\text{Tan} \propto)}{\pi D}$$

If one assumes a product speed of 20,000 f.p.m., a roll diameter of 8 in. (0.67 ft) and a helix angle of 45° C., which is the practical minimum for producing a satisfactory end cut, then the value of N is calculated as $$\frac{(20,000)(1)}{(\pi)(.67)} = 9502 \text{ R.P.M.}$$

As the helix angle increases in order to produce blunter end cuts, so must the rotational speed of the blades increase. Thus, for a helix angle 60°, N becomes $$\frac{(20,000)(1.73)}{(\pi)(.67)} = 16,438 \text{ R.P.M.}$$

A range of helix angles between about 45°–60° is considered to be optimum for the helical shear blades 44. Below 45°, the resulting cuts will be excessively sharp, whereas above 60°, the rotational drum speeds will exceed practical limits.

Figure 11:
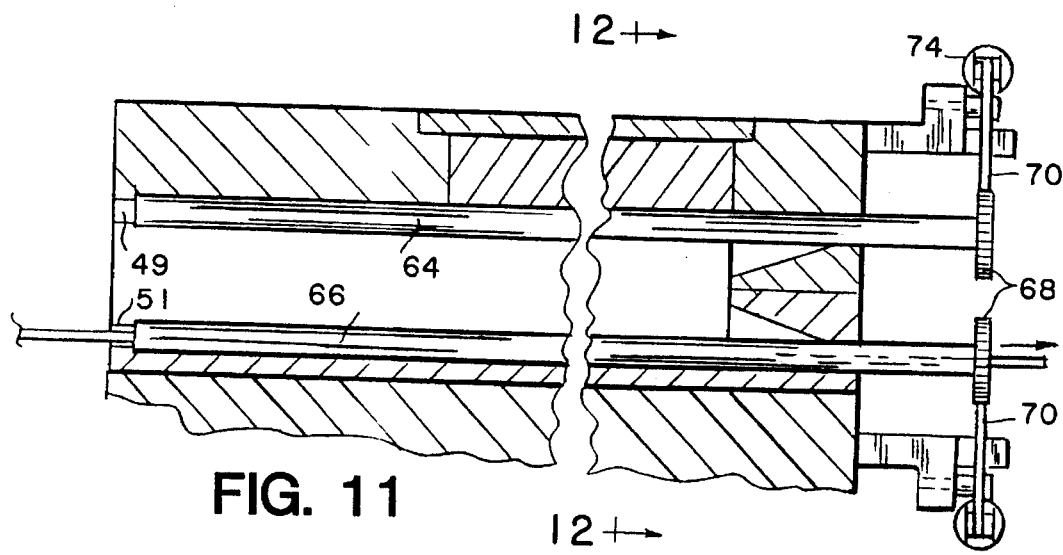
FIG. 11 is a view on an enlarged scale taken along line 11—11 of FIG. 4 and showing an alternative embodiment of the invention.
Figure 12:
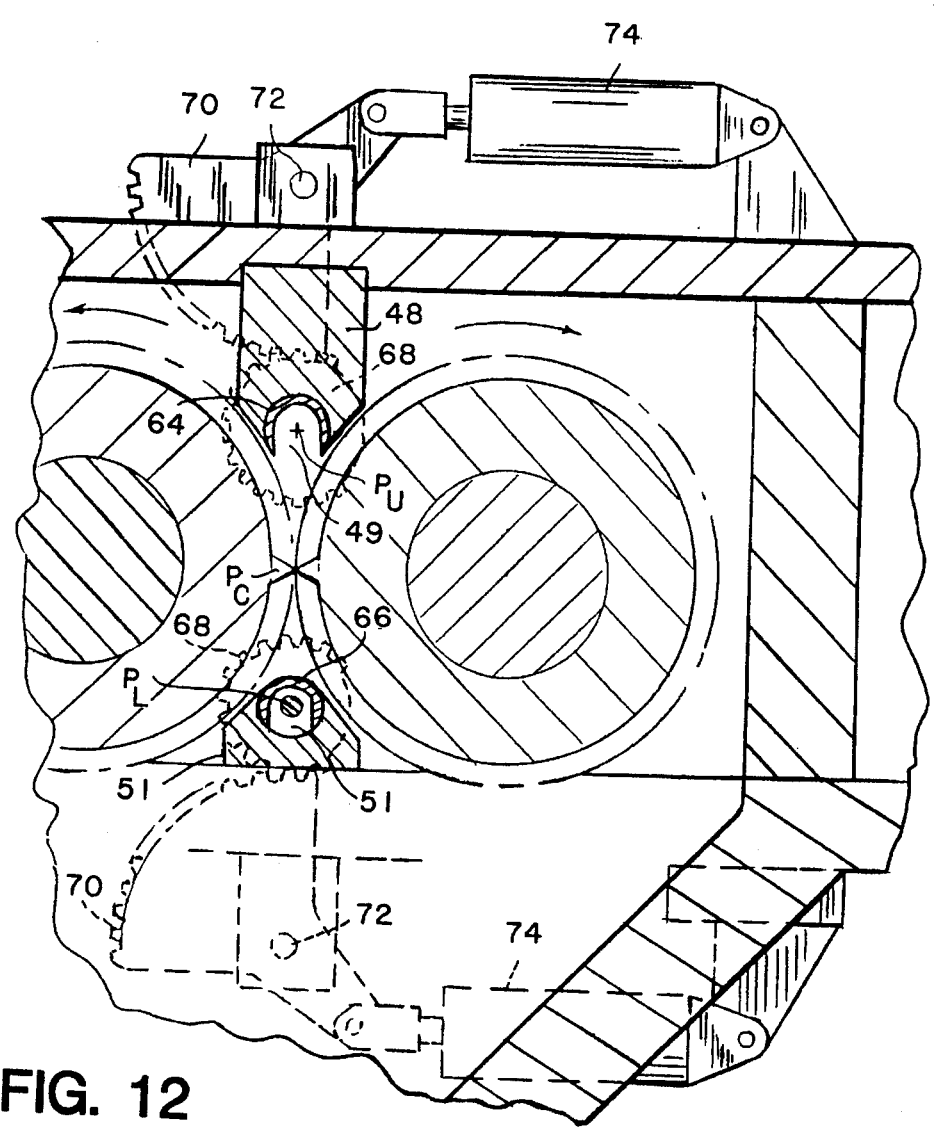
FIG. 12 is a view on a further enlarged scale taken along line 12—12 of FIG. 11.

Referring now to FIGS. 11 and 12, an alternative embodiment is shown having slotted guide pipes 64, 66 lining the grooves 49, 51 of the upper and lower guides 48, 50. The guide pipes are provided at their discharge ends with pinions 68 meshing with segmented gears 70. The gears 70 are rotatable about axes 72 and are driven through 90° strokes by piston-cylinder units 74. A 90° rotation of the gears 70 produces 180° rotation of the pinions 68.

As shown in FIG. 12, the upper guide pipe 64 is rotatably adjusted to its open position, with its slotted side wall ready to accept product being diverted upwardly across the cutting path $P_C$ into the upper guide path $P_u$. Product is shown running along the lower guide path $P_L$, with the lower guide pipe 66 rotatably adjusted to confine the product within the lower guide groove 51.

In preparation for effecting a cut of the product, the lower guide pipe 66 will be rotated 180° to its open position, thus clearing the way for the product to be switched upwardly across the cutting path $P_C$ into the open upper guide pipe 64. As soon as the cut has been effected, the upper guide pipe 64 is rotated to capture the product within the upper guide groove 49, and the lower guide pipe 66 is rotatably returned to its closed position. The guide pipes 64, 66 thus provide assurance that the product will not vibrate or otherwise stray unintentionally into the cutting path $P_C$.

In light of the forgoing, it now will be appreciated by those skilled in the art that the present invention offers significant advantages as compared to shears of the prior art. For example, the helical shear blades 44 operate continuously, yet inherently produce single cuts in response to diversion of the products from their paths of travel $P_T$ across the shear cutting paths $P_C$. This obviates any necessity for precisely coordinating blade orientation and speed with respect to the locations of the front and back ends of the product. Various combinations of helix angles, helix diameters and rotational drum speeds can be selected to accommodate different product speeds and cutting angles.

We claim:

1. Apparatus for shearing elongated products moving longitudinally along a path of travel, said apparatus comprising:

a pair of constant diameter helical blades mounted for rotation about axes parallel to said path of travel, the rotational orientation of said blades and the spacing between said axes being such that segments of said blades coact along a cutting path parallel to said path of travel;

means for rotating said blades in opposite directions to thereby cause the coacting segments thereof to move repetitively along said cutting path in the direction of movement of said products along said path of travel; and switch means for diverting said products from said path of travel across said cutting path for shearing by the coacting segments of said cutting blades.

2. The apparatus as claimed in claim 1 wherein said helical blades are carried respectively on rotatable cylindrical drums.

3. The apparatus as claimed in claim 2 wherein each helical blade circumscribes at least one turn about the circumference of its respective drum.

4. The apparatus as claimed in claim 1 wherein each of said cutting blades has a helix angle of between 45°–60°.

5. The apparatus as claimed in claim 1 wherein the axial length of each of said blades is equal to the circumference of the circular path circumscribed by the rotation thereof.

6. The apparatus as claimed in claim 1 further comprising guide means defining upper and lower guide paths extending in parallel relationship with said cutting path, said switch means being operable during a cutting cycle to divert said product from said lower guide path across said cutting path and into said upper guide path.

7. The apparatus as claimed in claim 6 wherein said upper and lower guide paths are defined respectively by downwardly and upwardly facing grooves in stationary guide elements.

8. The apparatus as claimed in claim 7 further comprising means for opening and closing said grooves to accommodate exit and entry of products during a cutting cycle.

9. The apparatus as claimed in claim 8 wherein said means for opening and closing said grooves comprises slotted guide pipes lining said grooves, and means for rotating said guide pipes between open positions at which their slots accommodate entry and exit of products from the respective guide grooves, and closed positions at which said pipes confine products in the respective guide grooves.

10. A system for shearing the front and tail ends of elongated products moving longitudinally along a path of travel, said system comprising:

(a) first and second shears positioned sequentially along said path of travel, each shear including:

(i) a pair of constant diameter helical blades mounted for rotation about axes parallel to said path of travel, the rotational orientation of said blades and the spacing between said axes being such that segments of said blades coact along a cutting path parallel to said path of travel; and (ii) means for rotating said blades in opposite directions causing the coacting segments thereof to move repetitively from one end to the other of said cutting path in the direction of movement of products along said path of travel; and (b) first and second switch means associated respectively with said first and second shears, said first switch means being operable to divert the tail end of a product from said path of travel across the cutting path of said first shear and said second switch means being operable to divert the front end of said product from said path of travel across the cutting path of said second shear, the diversion of said product across said cutting paths resulting in said product being sheared along said cutting paths by coacting segments of said cutting blades.

11. The system as claimed in claim 10 wherein the cutting paths of said first and second shears are arranged on different sides of said path of travel.

12. The apparatus as claimed in claim 10 wherein said switch means comprises a switch pipe having a receiving end aligned coaxially with said path of travel to receive said products, and having a delivery end adjustable between a first position aligned coaxially with said path of travel and a second position disposed angularly with respect to said path of travel to direct said products across said cutting path.

* * * * *